(12) United States Patent
Aguren

(10) Patent No.: US 8,693,865 B2
(45) Date of Patent: Apr. 8, 2014

(54) NETWORK SECURITY USING OPTICAL ATTENUATION DATA

(75) Inventor: Jerry Aguren, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 538 days.

(21) Appl. No.: 12/685,502

(22) Filed: Jan. 11, 2010

(65) Prior Publication Data

US 2011/0170858 A1 Jul. 14, 2011

(51) Int. Cl.
*H04B 10/08* (2006.01)
(52) U.S. Cl.
USPC .................................. 398/21; 398/22; 398/28
(58) Field of Classification Search
USPC .................. 398/20–22, 28, 169–171
See application file for complete search history.

(56) References Cited

U.S. PATENT DOCUMENTS

| 6,968,994 | B1 | 11/2005 | Smith |
| 8,233,804 | B2 | 7/2012 | Aguren |
| 8,260,132 | B2 | 9/2012 | Aguren |
| 2004/0037556 | A1* | 2/2004 | Matz et al. ........................ 398/40 |
| 2005/0174563 | A1* | 8/2005 | Evans et al. ................... 356/73.1 |
| 2007/0221730 | A1 | 9/2007 | McReynolds et al. |
| 2007/0240213 | A1* | 10/2007 | Karam et al. .................... 726/22 |
| 2008/0031620 | A1 | 2/2008 | Hudgins |
| 2008/0044179 | A1* | 2/2008 | Karpati ........................... 398/20 |
| 2008/0100456 | A1 | 5/2008 | Downie |
| 2008/0210852 | A1* | 9/2008 | Browning et al. ......... 250/227.14 |
| 2008/0240724 | A1* | 10/2008 | Aguren .......................... 398/139 |
| 2008/0265915 | A1* | 10/2008 | Clark et al. .................... 324/699 |
| 2009/0032577 | A1 | 2/2009 | Aguren et al. |
| 2009/0138958 | A1* | 5/2009 | Baum et al. ..................... 726/12 |
| 2009/0195363 | A1 | 8/2009 | Downie |
| 2010/0080554 | A1 | 4/2010 | Aguren |
| 2011/0153544 | A1* | 6/2011 | Nagel et al. ..................... 706/54 |
| 2011/0173315 | A1* | 7/2011 | Aguren ......................... 709/224 |

FOREIGN PATENT DOCUMENTS

| WO | 2008076235 | 6/2008 |
| WO | WO2011053306 A1 | 5/2011 |

* cited by examiner

*Primary Examiner* — Dzung Tran

(57) ABSTRACT

A data processing device is connectable to a communication network and operable to receive data associated with an attenuation characteristic of a transmission line of a cable in a cable communication subsystem, the subsystem comprising a transmitter and/or receiver coupled to the cable. The data processing device is responsive to the received data to initiate a security procedure.

21 Claims, 7 Drawing Sheets

|  | 1 | 2 | 3 | 4 | 5 |
|---|---|---|---|---|---|
| Cable disconnected and reconnected | X | X |  | X |  |
| Cable replaced |  |  |  | X |  |
| Tap detected |  |  |  |  | X |
| Cable disconnected or broken | X | X |  | X |  |
| Transceiver swapped |  | X |  |  |  |
| Connecter partially engaged |  |  | X |  |  |

FIG. 7

NETWORK SECURITY USING OPTICAL ATTENUATION DATA

BACKGROUND

Networking infrastructures such as data centers house large numbers of electronic equipment, such as computers and storage devices. Such networking infrastructures can span from a single room to multiple floors of an entire building. Servers are often stacked in rack cabinets that are placed in rows forming corridors so technicians can access the rear of each cabinet. Mainframe computers and other storage devices are often placed near the servers and can occupy spaces as large as the racks themselves.

Data centers and other networking infrastructures can have enormous numbers of cable and wires connecting various electronic equipments. Even though such facilities are highly organized, the number of cables interconnecting such equipment can be overwhelming. Installing, maintaining, and tracking cables and connections to equipment, and identifying degradation or failure of specific cable subsystems, can be complex. Timely identifying changes to network infrastructure that represent potential security related events can be problematic in such environments.

BRIEF DESCRIPTION OF THE DRAWINGS

In order that the invention may be well understood, various embodiments thereof will now be described, by way of example only, with reference to the accompanying drawings, in which:

FIG. 7 is a table illustrating some cable subsystem operational states that are detectable using cable subsystem components having various levels of enhancement;

Figure 1:
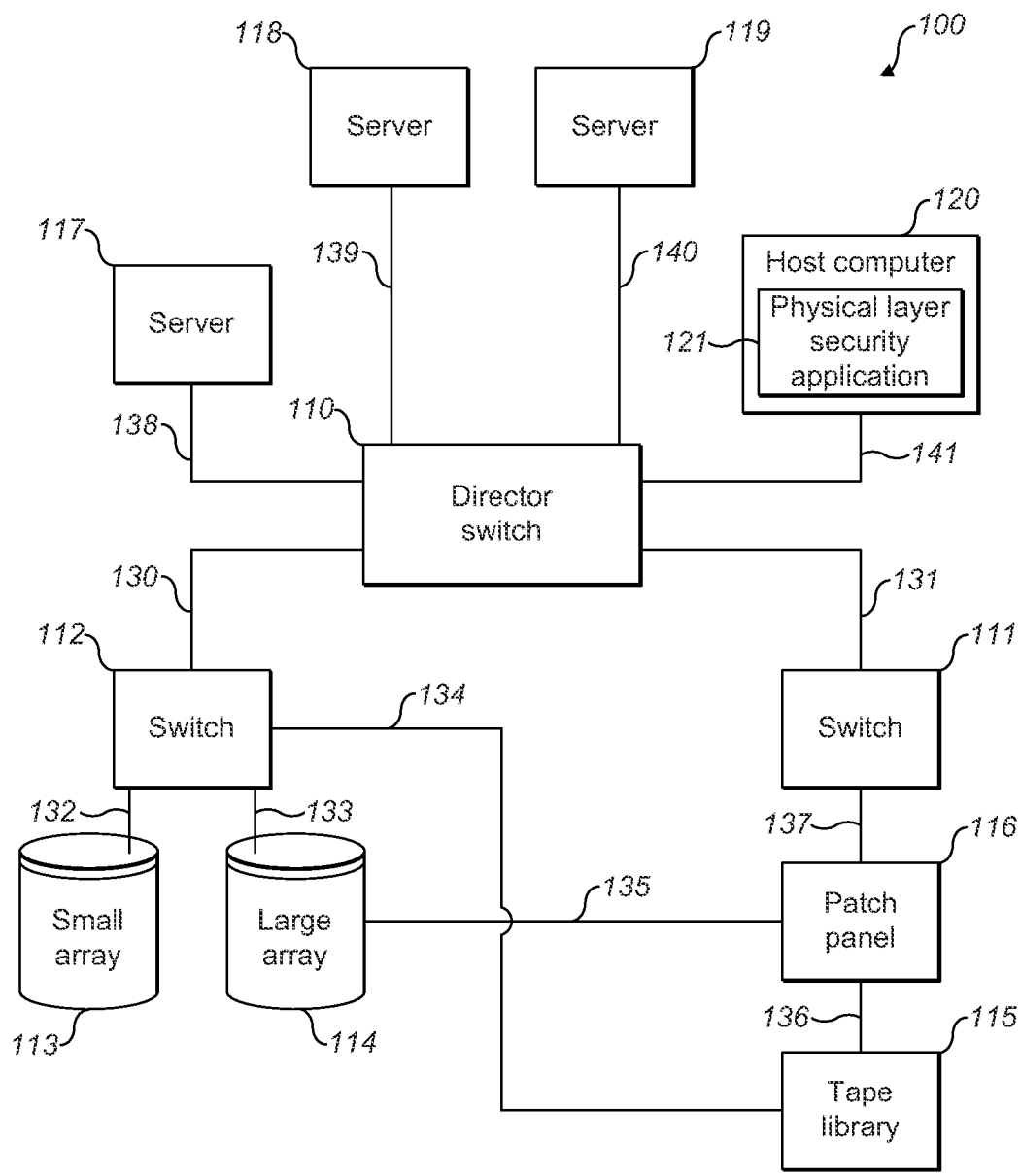
FIG. 1 is a high level diagram of a communication network, including a host computer having a physical layer security application.

Drawings are schematic and not to scale.

DETAILED DESCRIPTION

In accordance with some embodiments of the invention, a security manager is implemented, for example in software on a data processing device in the form of a network management server or other host computer. The exemplary management server is connected to a communication network such as a data centre, comprising a plurality of cable subsystems. Each cable subsystem has for example, a cable, respective cable end connectors at opposite ends of the cable, and two transceivers, the cable end connectors each coupled to a respective one of the transceivers to transmit and receive relatively high frequency and relatively high power communication signals through the cable. The transceivers are coupled, for example hot plugged, into respective network devices (examples: switch, controller of a storage device, server host bus adapter (HBA)), to enable the network devices to control the transceivers for transmitting and receiving signals through the cable.

Also in accordance with some embodiments, the cable end connectors and the transceivers use relatively low frequency, low power, monitoring and/or diagnostic channels to receive and store data associated with at least one physical layer characteristic of a cable subsystem in memory, for example in memory on the transceivers, in accordance with a suitable protocol. Network devices coupled to transceivers include functionality to access the data stored in the transceiver memory, and to communicate the data through the network to the network management server, for example using standard protocols such as SMI-S (Storage Management Initiative-Specification) or SNMP (Simple Network Management Protocol).

In at least some embodiments the security manager collects the cable subsystem physical layer data and assesses the physical layer data to determine a present operational state, or security state, of cables and transceivers of a cable subsystem. The accuracy of the determined operational state can vary between cable subsystems, depending on the sophistication of cable monitoring features of individual cable transceivers and connectors. The level of sophistication of physical layer monitoring and consequential level of accuracy of determination of operational state can vary between cable subsystems across the network, and such variations can be accommodated by the security manager. For example, in one embodiment an algorithm assesses the physical layer data and uses stochastic inference to determine an estimate of cable and transceiver operational state. The security manager also processes events received from the managed network devices and provides a notification service where required, for example by customer policies.

According to at least some embodiments, the security manager stores details of predetermined cable subsystem operating states that represent security states requiring initiation of a corresponding predetermined security procedure. In this manner, the network management server can initiate an appropriate security procedure in response to receipt of the cable subsystem physical layer data. The definition of which operational states represent security states, and/or of which security procedures correspond to which specific security states requiring initiation of a security procedure, can be at least partially effected by a customer/user of the data centre or other managed network setting policies. Some security procedures may be automatically effected, for example automatic deactivation of specific cables and/or transceivers. Some security procedures may require at least partial human involvement, for example to confirm a deactivation decision prior to effecting deactivation, or to authorise reactivation of a cable and/or transceiver on the network. Various embodiments of the invention facilitate network security decisions based on physical layer data, in contrast to inferring physical layer status from higher-level information, for example from OSI layer 2 frames. At least some embodiments facilitate a real-time security response to network security breaches defined using customer security policies.

In some embodiments, the cable includes multiple transmission lines. For example, a multimode fiber optic cable for use in a data centre may comprise two transmission lines in the form of two optical fibers. In use, one fiber is connected to a transmitter optical subassembly of a transceiver, and the other fiber is connected to a receiver optical subassembly of the transceiver. Enhanced transceivers are provided that include respective embedded reflectometers, for example in the form of embedded optical time domain reflectometers (OTDRs). An enhanced transceiver may detect a reflected test pulse using the receiver optical subassembly as a photodetector, by redirecting reflected energy from the transmitter fiber through an end of the receiver fiber. In alternative embodiments, the reflected energy is detected using an additional photodetector. Enhanced transceivers may also be provided for other types of cable, for example single mode and/or single fiber cable, and/or electrical communication cable.

Data collected by the OTDR is stored, for example in a memory of the transceiver provided for storing OTDR data, and processed to obtain an attenuation characteristic indicative of the rate of attenuation of the reflected signal relative to distance along the optical fiber. Processing of the data can occur in circuitry on board the transceiver and/or maybe transmitted to another device for processing. The results of the processing are stored in a memory on the transceiver, or alternatively on the network device hosting the transceiver, and made available to the security manager. The security manager can compare updated OTDR attenuation characteristic data with historical OTDR attenuation characteristic data to determine whether a significant increase in attenuation has appeared at any specific location along the optical fiber since the last update. This determination is used to determine a present security state, and a corresponding security procedure may be initiated taking into account the potential tap to the optical fiber.

At least some embodiments of the invention facilitate the provision of a convenient and cost-effective transmission line tap monitor service. The provision of indications relating to breaks in or degradation of transmission lines can also be facilitated. The level of sophistication of reflectometer components required to identify major attenuation anomalies indicative of many types of optical tap, for example a tap implemented using an adapter and tapping, say, 50% of signal energy, is available at relatively modest cost, sufficient to enable cost-effective embedding of reflectometers in transceivers.

FIG. 1 illustrates an exemplary communication network 100, for example a data communication network in the form of a data centre comprising high throughput fiber optic communication cables and devices, although embodiments of the invention are applicable to any communication network. The network comprises a director switch 110, network switches 111, 112, storage arrays 113, 114, a tape library 115, a patch panel 116, servers 117, 118, 119, and a host computer system 120 such as a network management server to execute a physical layer security application 121.

Figure 2:
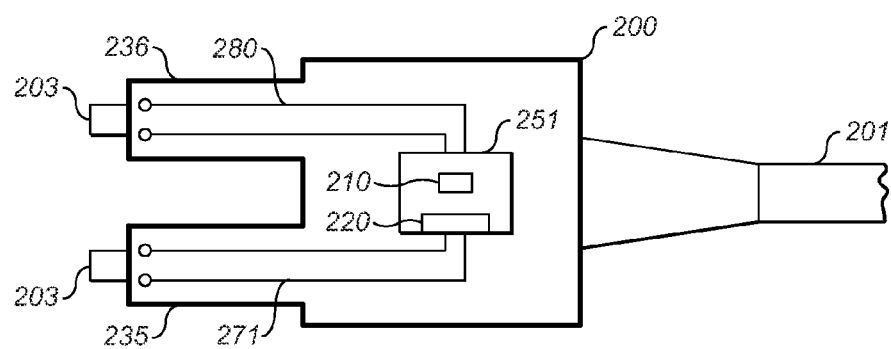
FIG. 2 shows selected features of a cable end connector connected to a cable.

Cables 130 to 141 are shown interconnecting various ones of the network devices 110 to 120. Opposite ends of the cables 130 to 141 are terminated using cable end connectors. At least some of the end connectors are active end connectors such as the end connector 200 of FIG. 2, which comprises memory 210 for storing data relating to physical layer characteristics of a cable subsystem and a communication interface 220 for communicating with a transmitter and/or receiver to provide a relatively low frequency and low power diagnostic and/or monitoring channel. The data can be stored and accessed, for example according to the SFF-8472 Specification for Diagnostic Monitoring Interface for Optical Transceivers, extended as necessary to accommodate the desired data physical layer parameters, or any other suitable protocol. The end connector 200 represents an LC connector, and the cable 201 comprises, for example, two transmission lines in the form of respective multimode optical fibers 203, 204. However, in alternative embodiments any other cable end connector type and appropriate corresponding cable type (including single mode optical fiber cables and electrical communication cables), suitable for use in a communication network, can be employed.

Figure 3:
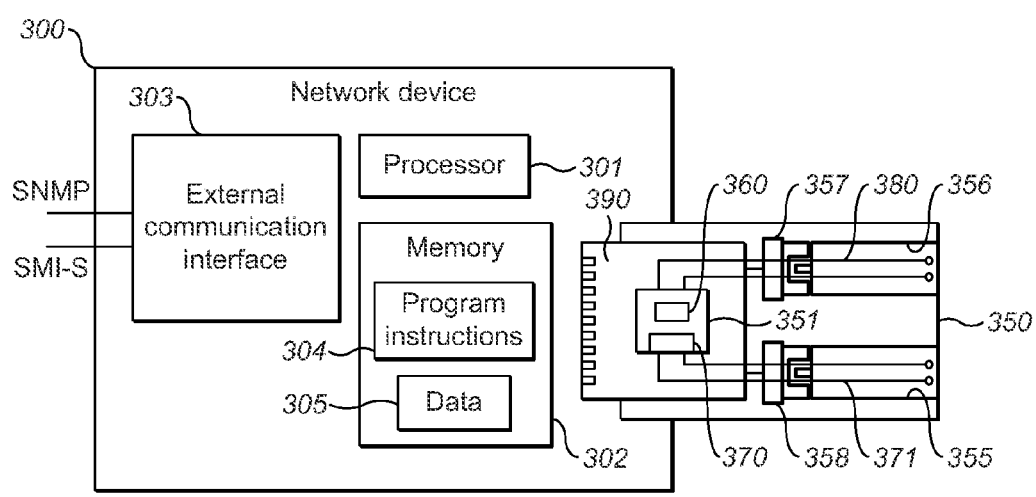
FIG. 3 shows selected features of a network device and of a transceiver connected to the network device.

Active network devices such as the switches 111, 112, storage arrays 113, 114, tape library 115 and servers/hosts 117 to 120 are operable to transmit and/or receive communication signals through the network using transmitters and/or receivers. An exemplary network device 300 is shown in FIG. 3, having an exemplary transceiver 350 connected thereto. The transceiver 350 shown in FIG. 3 represents an SFP (Small Form-factor Pluggable), SFP+, or SFF optical transceiver. However, in alternative embodiments any other transceiver, transmitter or receiver type suitable for use in a communication network can be employed, including those for connecting to electrical communication cables. The transceiver 350 includes a memory 360 for storing, for example according to SFF-8472, data relating to physical layer characteristics of a cable subsystem 200, 201, 350, and a communication interface 370 for communicating with a cable end connector 200 over the relatively low frequency and low power diagnostic and/or monitoring channel.

The exemplary network device 300 comprises a processor 301 a memory 302 and an external communication interface 303. The memory 302 stores computer program instructions 304, for example in the form of software and/or firmware, to provide at least some of the functionality of the network device. The network device 300 is operable to read the physical layer data stored in the transceiver memory 360. Communication between the network device 300 and the transceiver 350 can be effected, for example, using an inter-integrated circuit communication protocol such as I2C. The received physical layer data 305 can be stored, for example according to SFF-8472, in network device memory 302, and communicated to the physical layer security application 121 on the host computer 120 over the network 100 by the external communication interface 303 using any appropriate protocol, for example, SMI-S (Storage Management Initiative-Specification) or SNMP (Simple Network Management Protocol).

Where the network device 300 comprises a switch 111, 112, the switch software stack supports extended MIB (management information base) and CIMOM (common information model object manager) and provides SMI-S and SNMP functionality for communicating the data 305 over the network 100. Where the network device 300 comprises a storage controller, such as a disc array 113, 114 controller or tape library 115 controller, the storage controller software stack supports extended MIB and CIMOM and provides SMI-S and SNMP functionality for communicating the data 305 over the network 100. A network device 300 comprising a host computer such as a server 117 to 120 includes a network interface controller (example: Fibre Channel host bus adapter) having firmware to support reading extended physical layer data from the transceiver 350, and the host computer software stack includes a network interface controller driver also supporting reading the extended physical layer data 305, and provides SMI-S and SNMP functionality for communicating the data 305 over the network 100.

In one embodiment, the transceiver 350 comprises an integrated circuit (IC) device 351 that provides the memory 360 and the communication interface 370. The transceiver IC device 351 in some embodiments comprises a very low power IC tag device. The exemplary transceiver includes electrical contacts 371 to mate with corresponding electrical contacts 271 of the connector 200. The transceiver electrical contacts 371 extend between the communication interface 370 and one of the recesses 355, 356, which recesses receive respective ends 235, 236 of the cable end connector 200 to mate optical fibers 203 of the cable end connector 200 with respective optical components of a transmitter optical subassembly 357 and a receiver optical subassembly 358 of the transceiver 350. The transceiver also comprises a communication interface (451, FIG. 4) to communicate with the network device 300.

The cable end connector 200 comprises an IC device 251 that provides the memory 210 and the communication interface 220. The connector IC device 251 in some embodiments comprises a very low power IC tag device. The electrical contacts 271 of the connector 200 extend between the communication interface 220 towards a front end portion of the connector 200 to mate electrically with the transceiver electrical contacts 371 when the connector 200 is received in the transceiver 350. A connector engagement detection mechanism (not shown) may be provided to provide information regarding connector/transceiver engagement state, for example whether a connector is fully engaged, partially engaged or not engaged with a transceiver.

The transceiver 350 and/or the connector 200 can include a visual indicator (not shown) for indicating operational states of the cable subsystem. For example, light from an LED (not shown) controlled by the transceiver IC device 351 can be channeled by a light pipe through the transceiver to an externally accessible region of the transceiver 350 and, when a connector 200 is connected to the transceiver, channeled by a further light pipe of the connector 200 through portions of the connector to a user visible region of the connector.

Communication between the connector IC device communication interface 220 and the transceiver IC device communication interface 370 over the electrical contacts 271, 371 can be by any convenient inter-integrated circuit protocol, and the IC devices 251, 351 can be arranged to automatically transfer or exchange physical layer characteristic data stored in the memories 210, 360. In some embodiments, further electrical contacts 280, 380 can be provided on the connector 200 and the transceiver 350 to provide low level electrical power from the transceiver IC device 351 to the connector IC device 251 when the connector 200 is engaged with the transceiver 350. In alternative embodiments, the transceiver communication interface 370 can take the form of an RFID reader, and the connector IC device 251 can take the form of an RFID tag having a communication interface 220 in the form of an RFID transponder with parasitic power supply, to transfer data between the connector 200 and the transceiver 350, for example as disclosed in US 2008/0240724A1, now U.S. Pat. No. 8,260,132, which is incorporated herein by reference in its entirety. In some embodiments, RFID transponders respectively associated with a connector and transceiver are adapted to communicate with one another to allow information from each of the transponders to be communicated to an RFID reader via communication with only one transponder, as disclosed in US2008/0100456A1, which is incorporated herein by reference in its entirety, and from the RFID reader to the security application 121.

Figure 4:
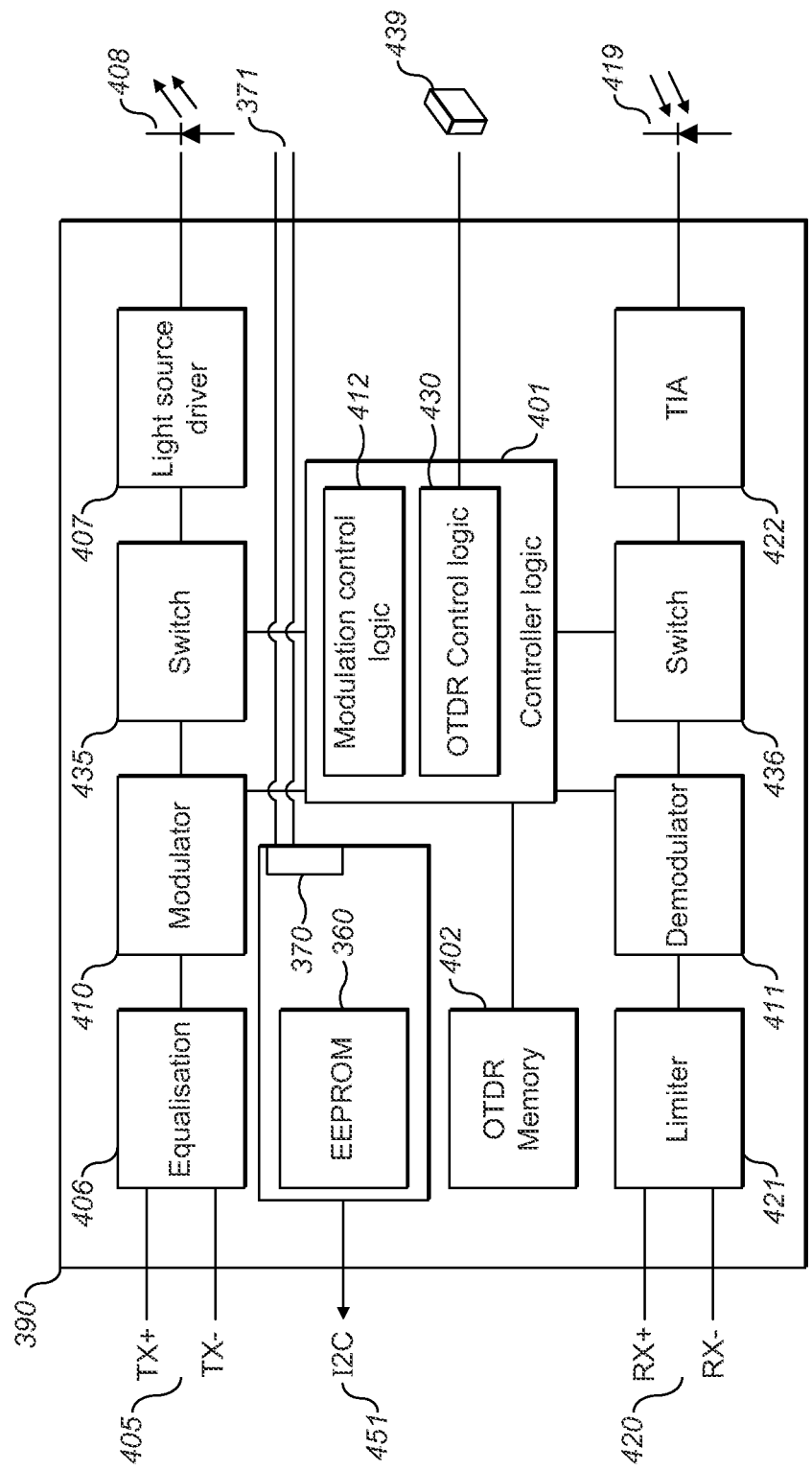
FIG. 4 is a functional diagram illustrating control circuitry of a transceiver, including reflectometer control logic.

FIG. 4 shows circuitry of the transceiver 350, supported for example on a circuit board 390 of the transceiver 350. The transceiver 350 comprises a transmission control channel including an electrical transmitter control connection 405, equalisation circuitry 406 and a light source driver 407 for controlling a light source 408, for example a transmitter optical subassembly comprising a laser diode or VCSEL. The transceiver 350 also comprises a receiver control channel including a TIA (transimpedance amplifier) 422 to receive signals from a receiver optical subassembly 419 including for example a laser diode, limiter circuitry 421 and an electrical connection 420. Controller logic 401 implements various functions of the transceiver 350. The transceiver circuitry implements an inter-integrated circuit interface 451, for example an I2C interface, to enable access to the memory 360, for example by a network device 300 hosting the transceiver 350.

The exemplary transceiver 350 comprises a first enhancement in the form of a low-frequency diagnostic side band communication channel provided by a modulator 410 in the transmission control channel, a demodulator 411 in the receiver control channel, and modulation control logic 412. In one embodiment, the side band communication channel can be implemented, for example, as disclosed in U.S. patent application Ser. No. 12/241,945, now U.S. Pat. No. 8,233,804. The side band communication channel enables cable subsystem physical layer characteristic data to be communicated between enhanced transceivers 350 at opposite ends of a cable, to facilitate collection of complete cable subsystem physical layer data at both ends of a cable.

The exemplary transceiver 350 comprises a second enhancement comprising an embedded reflectometer in the form of an OTDR (optical time domain reflectometer) including control logic 430 and OTDR memory 431. The OTDR logic operates to close normal transmissions through the transmission control channel and receive control channel, using switches 435, 436, and causes the laser 408 to send a test pulse through the transmission fiber channel to obtain attenuation data in respect of the transmission cable. In one embodiment, the OTDR control logic 430 controls a light valve 439 to enable reflections of the test pulse from the optical transmission fiber to be channelled to the receiver optical subassembly 419 through the optical receiver fiber channel, as described in PCT patent application number PCT/US2009/062709, WO 2011/053306, which is incorporated herein in its entirety. Alternatively, a further light detector can be provided for receiving OTDR reflections from the transmission fiber. The digitally sampled signals resulting from detection of the OTDR test pulse reflections can be stored in OTDR memory 402. The sampled signals can be processed on board the transceiver 390, or transferred to another device, for example the transceiver's host network device, for processing. The attenuation pattern resulting from the processing of the OTDR data should be sufficiently accurate to indicate whether, for example, an optical tap has been placed on a cable, for example using a cable adapter, and to approximately identify the distance of the tap location along the cable, even using components of relatively modest sensitivity and cost. For a dual fiber cable, OTDR data can be obtained for the receiver fiber channel from a transceiver 350 with the second enhancement at an opposite end of the cable, using the side band communication channel.

Various cable subsystem physical layer characteristic data can be stored in the memory 210 on the cable end connector 200 and in the memory 360 of the transceiver 350. Cable data parameters stored in the connector memory 210 and transceiver data parameters stored in the transceiver memory 360 can be transmitted between the memories 210, 360 and stored in both memories 210, 360. Furthermore, cable data parameters and transceiver data parameters can be received from a connector 200 and transceiver 350 at an opposite end of the cable using the sideband communication enhancement, and also stored in the transceiver memory 360 and the connector memory 210. Storage of data in the connector memory 210 can provide convenient access to the data in certain circumstances, for example to enable convenient access to the data by a handheld RFID reader. In some embodiments, a transceiver (not shown) is provided that omits the modulated sideband first enhancement and/or the OTDR second enhancement.

In at least some embodiments, variously stored cable subsystem parameters relate to identifiers of cables, connectors, and transceivers, and/or to present quality of cable subsystem communication performance. Cable parameters can include, for example, at least one of the following non-limiting exemplary cable parameters: cable serial number; connector type, cable type manufacturer identification, manufacturer's data, cable performance parameters such as attenuation characteristics during installation. Transceiver parameters can include, for example, at least one of the following nonlimiting exemplary transceiver parameters: transceiver identifier, laser transmitter optical power, laser transmitter current, photodiode receiver optical energy. OTDR data, for example data indicating a possible optical tap, is also stored in the transceiver memory 360 and the connector memory 210. In some embodiments relating to electrical communication cables, analogous electrical cable parameters can be provided corresponding to some of the optical-specific parameters mentioned above, including electrical TDR data.

Figure 5:
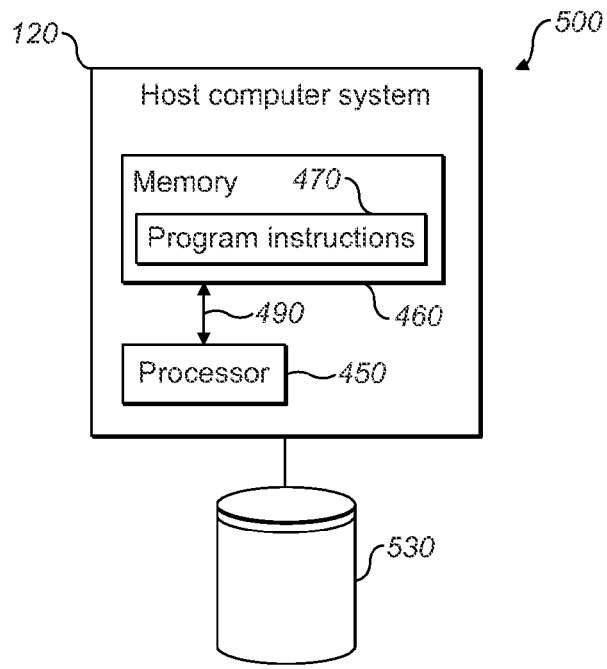
FIG. 5 shows selected features of the host computer system.

FIG. 5 illustrates an exemplary system 500 to execute the physical layer security application 121. The system includes provision for calculating during use the operational condition of a cable system comprising multiple cable subsystems, and to initiate security procedures responsive to received cable subsystem physical layer characteristic data. The system 500 includes a host computer system 120 and a repository, warehouse, or database 530. The host computer system 420 comprises a processing unit 450 (such as one more processors or central processing units, CPUs) for controlling the overall operation of memory 460, for example RAM (random access memory) for temporary data storage and ROM (read-only memory) for permanent data storage. The memory stores program instructions 470 for implementing a security manager (610, FIG. 6) and other security related applications. The processing unit 450 communicates with memory 460, database 530, security manager 610 and many other components via buses 490. The program instructions 470 may also implement a cable monitoring and diagnostic system (not shown). Embodiments in accordance with the invention are not limited to any particular type or number of databases and/or host computer systems. Exemplary host computer systems include, but are not limited to, computers (portable and non-portable), servers, mainframe computers, distributed computing devices, laptops, and other electronic devices and systems whether such devices and systems are portable or nonportable.

Figure 6:
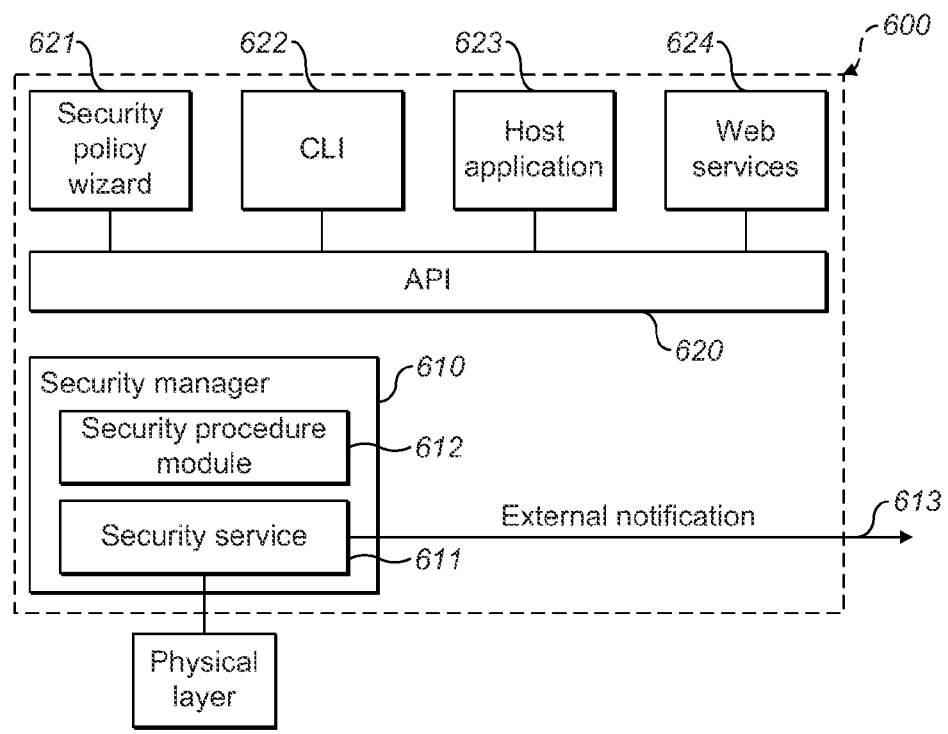
FIG. 6 illustrates an arrangement of computer programs executable on the host computer system, including a security manager.

FIG. 6 shows the interaction of various applications 600 implemented by the computer instructions 470 of the host computer system 120 shown in FIG. 5, including a security manager 610. In the present embodiment, the security manager 610 is operable to receive data associated with various physical layer characteristics of at least one cable communication subsystem. That is, the security manager 610 receives, for example from a network device over the network 100 using SNMP or SMI-S, data such as transceiver operational parameters from both ends of a cable subsystem, OTDR generated data regarding potential optical fiber taps, and cable identification and performance parameters.

Conveniently, the security manager is implemented using a security service module 611 and a security procedure module 612. The security service 611 executes for example, data collection and event processing from managed network devices. Some security related data may be obtained by polling managed network devices at frequencies appropriate to the perceived security threats. Other security related data may be obtained using events triggered by the managed network devices, for example if an embedded OTDR detects a potential optical tap in a fiber optic cable. The security service 611 determines (including in some embodiments by stochastic inference) a security state for a cable subsystem, using the received physical layer data and stored predefined possible states. The security service 611 provides the presently determined security state to the security procedure module 612. The security service 611 also provides external notification 613, for example to a network administrator, where required.

Security configuration data is stored, for example in the database 530, for maintaining and implementing received customer security policies, and can include security procedure algorithms. The security procedure module 612 is arranged to receive a presently determined security state from the security service 611 and to determine an appropriate security procedure in accordance with the received security state and the stored security configuration data. The security procedure module 612 is also arranged to output information for the customer relating to any security procedure initiated by the security manager 610 in response to a security state. The security procedure manager 612 may also be arranged to output information to the security service 611, for example to initiate a security related action by a managed device, and/or to trigger a notification or logging action by the security service 611.

The exemplary program instructions 470 also implement a security policy wizard application 621 and an API (application programming interface) 620 to facilitate input of customer policies to the security module 612. Other applications may also be implemented and communicate with the security manager 610 through the API 620, for example a command line interface application 622, host application 623 (example: data centre management application) and/or web services application 624.

The exemplary network 100 of FIG. 1 can accommodate cable subsystems which vary widely as to the range of physical layer data they are able to provide for cable security, monitoring and diagnosis. Accordingly, the accuracy with which operational states and security states can be assessed can vary widely between network devices. It is envisaged that network administrators will select transceivers and cables with the various enhancements described above for network connections where improved accuracy and security is desired. Different respective security policies can be set for different respective cable subsystems.

The table of FIG. 7 lists in the left-hand column various possible cable subsystem operating conditions or detectable events that can be used to define security states, and along the top row various levels of ability to provide various data associated with physical layer characteristics of a cable communication subsystem. The ability to provide a varied range of data is related to the degree of enhancement of the transceiver(s) and/or cable end connectors of a cable subsystem. Marks in the boxes of the table of FIG. 7 indicate whether a specific operating condition can be determined using a specific level of ability to provide physical layer data. All columns in FIG. 7 represent a cable subsystem, or network of cable subsystems, including at least one transceiver that is capable of collecting physical layer data in transceiver memory for access by a network device hosting the transceiver, the network device being operable to access the data and further communicate the data to a physical layer security application 121.

Column 1 in FIG. 7 represents the use of a cable subsystem, or network of cable subsystems, having a transceiver that is capable of collecting in transceiver memory data relating to a present quality of communication performance of the transceiver. Such data can comprise, for example, transmitter power and/or transmitter current parameters, photodiode receiver energy parameters. Column 1 does not necessarily relate to cable subsystems having enhanced side band communication or cable tap detection capability. However, provided that the network devices 300 hosting column 1 transceivers at each end of the cable support receiving physical layer data 305 from the transceiver and communicating the data to the physical layer security application 121, the security application 121 can obtain the physical layer data from both ends of the cable subsystem. It can be seen from FIG. 7 that column 1 cable subsystems can enable a physical layer security application 121 to detect (including infer) that a cable is disconnected and reconnected, and also that the cable is disconnected or broken, by piecing together the quality of communication performance data from both ends of the cable. The security application 121 can in some embodiments enable a network user or administrator to select an identified multi cable link, or route, between network devices, the link comprising various cable subsystems, and monitor the constituent cable subsystems of the link to identify any cable connection topology changes involving the link, employing various detectable operating conditions as required, for example the cable disconnected and reconnected condition and/or the cable replaced condition.

Column 2 in FIG. 7 represents a cable subsystem, or network of cable subsystems, using transceivers at both ends of the cable that support side channel communications, for example an accordance with the first enhancement described above. Because transceivers at both ends of the cable subsystem store physical layer data relating to the transceiver at the opposite end of the cable subsystem, including transceiver identity data, if one of the transceivers is swapped for a transceiver having a different identity, or no side channel communication capability, the security application 121 can detect the transceiver swap by comparing historical and present transceiver identity data stored at the remaining transceiver. The column 2 arrangement can also be used to detect cable disconnection and reconnection, and cable disconnected or broken, as described above in connection with the column 1 arrangement.

Column 3 in FIG. 7 represents the use of cable end connectors and corresponding transceivers modified to detect and engagement state of the connector in the transceiver, for example no engagement, partial engagement, or full engagement, and supplied the engagement state data to the transceiver memory. The security application 121 can use the stored data to detect a connector partially engaged condition.

Column 4 in FIG. 7 represents cable subsystems that use cable end connectors and transceivers that can bring together physical layer data from cable end connectors and their respective interconnected transceivers. For example, column 4 end connectors and transceivers may exchange physical layer data when interconnected, such as in response to the interconnection of respective IC devices 251, 351 by means, for example, of electrical contacts or RFID connection. The column 4 arrangement permits detection when a cable storing identity information is replaced with another cable having a different identity, or no identity, by comparing a present cable identity stored in transceiver memory with a previously stored cable identity. Column 4 cable subsystems can also in most circumstances enable a physical layer security application 121 to detect that a cable is disconnected and reconnected, and that the cable is disconnected or broken.

Column 5 in FIG. 7 represents the use of transceivers with cable tap detection capability, for example using transceivers with embedded OTDR capability, in accordance with the second enhancement described above. OTDR data from the transceiver can be used by the security application 121 to detect cable taps.

Figure 8:
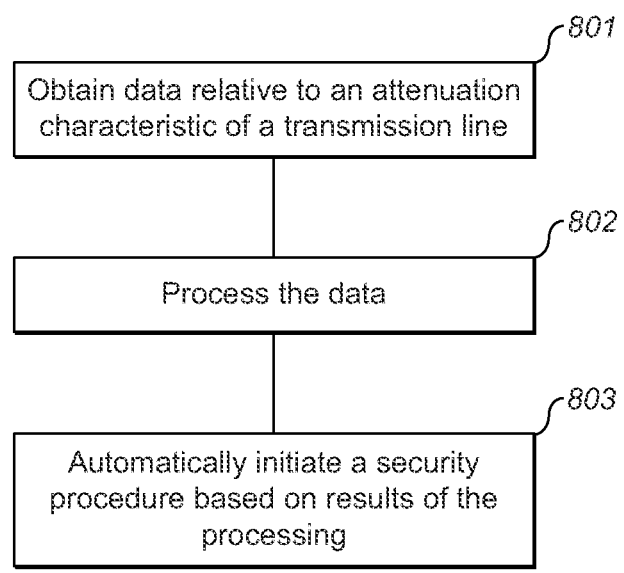
FIG. 8 illustrates a method of applying physical layer security in a communication network.

FIG. 8 is a flow diagram illustrating a method of applying physical layer security in the communication network 100 comprising a transceiver 350 coupled to a host network device 300, and at least one cable 201 coupled to the transceiver 350 to communicate with another network device 300. In step 801, data is obtained relating to an attenuation characteristic of a transmission line, for example an optical fiber or electrical communication cable, of a cable presently connected to a transceiver 350 having an embedded reflectometer. In step 802 the data is processed, and in step 803 a security procedure is automatically initiated if required based on results of the processing. At least some of the data, may, for example, be received and stored in a memory 210 and/or 360 and/or 302.

In at least some method embodiments according to the invention, the security manager 610 receives data including: transceiver communication input/output parameters (transmitter optical power and current, optical receiver energy), transceiver identifiers (example: serial numbers) and connector engagement status (not engaged, partially engaged, fully engaged) from both ends of a cable subsystem, cable identification and performance parameters, and the OTDR-generated data. The data is collected for example from a network device 300 through the network 100, for example over a cable or wireless link using SNMP or SMI-S, by polling the network device 300 to provide data from the memories 360 of all its transceivers 350, or from a specifically identified transceiver. OTDR-generated data regarding the presence of potential optical fiber taps, and other potentially time sensitive data, can also be received by virtue of events notified by a managed network device 300. The security manager 610 determines a security state based on the received data, and determines an appropriate security procedure in accordance with the received security state, stored customer security policies and stored security procedure algorithms. The security manager 610 initiates the appropriate security procedure. For example, a managed network device 300 may be required to disable a cable subsystem communication link in response to detection of unplugging of a cable from a transceiver. The security manager 610 can send notifications to a network administrator and/or data centre customer to inform them of the security procedure, and of any further action that might be required to permit reconnection to the affected cable subsystem of the unplugged cable or another cable. The security manager 610 can also cause a transceiver 350 to control its LED to visually display a security status.

Figure 9:
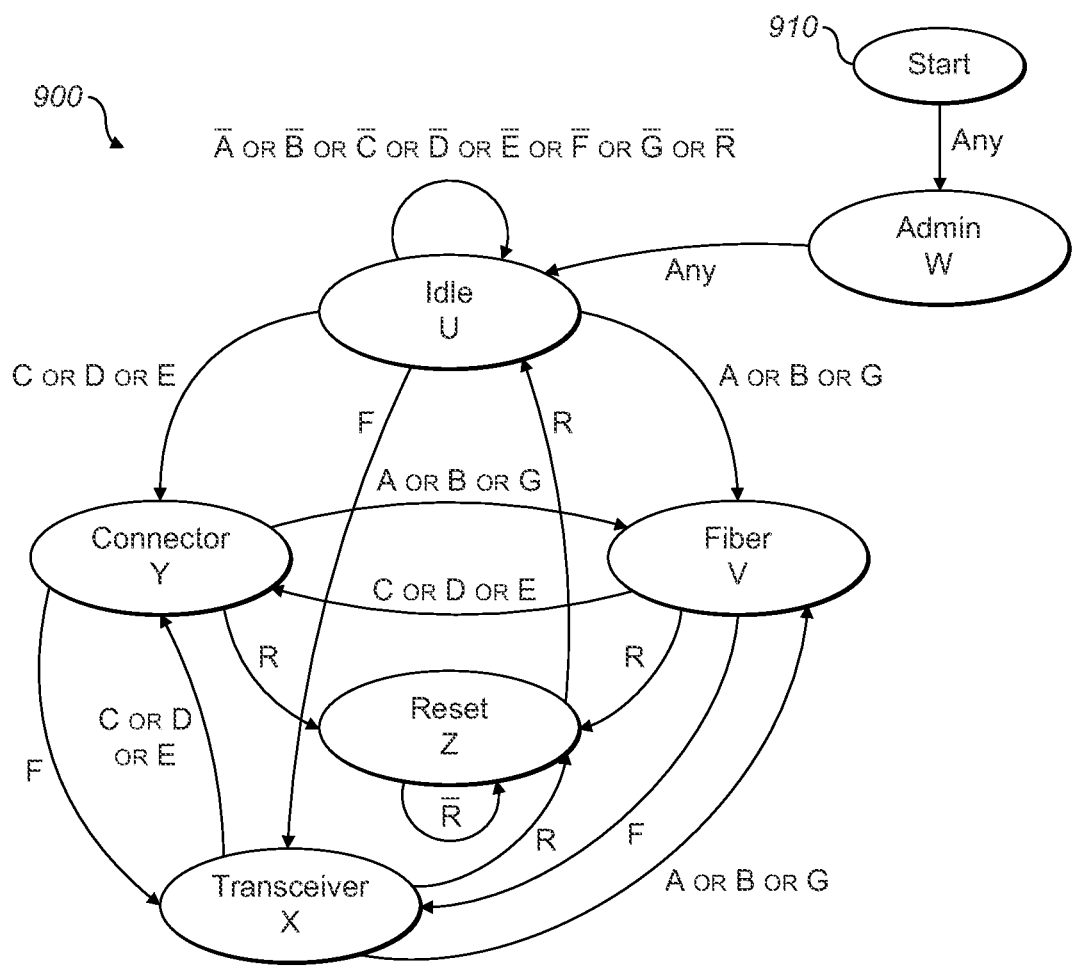
FIG. 9 is a state diagram of an exemplary state machine to implement physical layer security.

In one embodiment, the security manager 610 may comprise a state machine 900 according to the state diagram illustrated in FIG. 9. The exemplary Moore state machine 900 comprises the following states:

U Idle
V Security issue relating to fiber
W Administrator state
X Security issue relating to transceiver
Y Security issue relating to connector
Z Reset The exemplary state machine 900 and further comprises the following possible inputs, the inputs representing various detectable operating conditions that may be indicative of a security breach:

A No optical power detected in both fibers
B No optical power detected in one fiber C Connector engagement problem
D Cable serial number different to previously stored serial number
E Cable connection and/or disconnection problem
F Transceiver serial number different to previously stored serial number
G Tap detected in cable
R Reset As seen in FIG. 9, from the start 910 any input results in transition to the Admin state 911, from which date any input results in transition to the Idle state U. In the Idle state U, a negation of any of the permissible inputs results in a return to Idle U. In Idle receipt of an input C, D or E results in a transition to the Connector state Y, receipt of an input capital A, B or G results in a transition to the Fiber state V, and receipt of an input capital F results in a transition to the Transceiver state X. Receipt of inputs A, B or G in the connector state Y or in the transceiver state X results in a transition to the Fiber state V. Receipt of inputs C, D or E in the Fiber state V or in the transceiver state X results in a transition to the Connector state Y. Receipt of input F in the Fiber state V or in the Connector state Y results in a transition to the Transceiver state X.

The Reset R input can be arranged to occur automatically in the Connector state Y, the Fiber state V or the Transceiver state X, and results in a transition to the Reset state Z. The Reset R input can be arranged to provide notification, logging, link disablement, LED visual status indication and clearing of errors, and to require manual input in some circumstances. A Reset R input in the Reset state Z can be used to return the state machine to Idle.

In at least some embodiments of the invention, the provision of a real time transmission line tap monitor and response service is facilitated. At least some embodiments of the invention facilitate the provision of a transmission line breakage and/or degradation indication service.

In at least some embodiments, a network physical layer security system is provided that can use polling, exceptions and traps, according to the desired protocol, to gather communication transceiver-based, for example SFP+ based, diagnostic information from a network device hosting the transceiver. The gathered data may be stored in a centralised or distributed network database. Real-time, or near real-time security responses may be provided by the system. A communication cable subsystem can have many different combinations of operating conditions for its different elements. The physical layer security system facilitates definition of which operating conditions constitute a possible breach of security, and what action should be taken in response to an identified security breach. For example, depending on a level of severity accorded to specific security breaches, the application could for example send an e-mail notification to a network administrator and/or user, store details of the event in a log, or shut down one or more cable subsystems in an affected link.

As used herein an SFP or small form-factor pluggable is an optical transceiver used in optical communications for telecommunication and/or data communications. SFPs (including SFP+) interface network devices to fiber optic cable. Real time means that the time taken to initiate an action such as a security procedure is sufficiently short to be perceived by a human user, such as a network administrator, as adequate to enable a timely and appropriate response consequent to the action, and can vary depending on the requirements surrounding different types of actions. In at least one exemplary embodiment, one or more steps discussed herein are automated, in other words, occur automatically. As used herein, the terms "automated" or "automatically" (and like variations thereof) mean controlled operation of an apparatus, system and/or process using computers and/or mechanical/electrical devices without the necessity of human intervention, observation, effort and/or decision.

Methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, specific numerical data values (such as specific quantities, numbers, categories, etc.) or other specific information should be interpreted as illustrative for discussing exemplary embodiments. Such specific information is not provided to limit the invention.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A data processing device connectable to a communication network and comprising at least one processor to:
receive data associated with an attenuation characteristic of an optical fiber of a cable in a cable communication subsystem, the subsystem comprising a transceiver coupled to the cable;
based on a comparison of the received data with historical data associated with the attenuation characteristic, determine that an optical tap has been applied to the optical fiber of the cable;
initiate a security procedure in response to determining that the optical tap has been applied to the optical fiber;
receive physical layer characteristic data relating to the cable communication subsystem; and
determine operating conditions of the cable communication subsystem based on the physical layer characteristic data, the operating conditions including plural conditions selected from among: a condition in which the transceiver for communicating optical signals in the optical fiber has been swapped, a condition in which the cable has been disconnected and then reconnected, a condition in which the cable has been replaced, and a condition in which a connector of the cable is not engaged or is partially engaged.

2. The data processing device of claim 1, wherein:
the physical layer characteristic data includes a transceiver power; a transceiver identifier; and an identifier of the cable.

3. The data processing device of claim 1, wherein the cable comprises a dual optical fiber cable connected at opposite ends to respective fiber optic transceivers, and the data is obtained for each respective optical fiber of the cable from a respective one of the transceivers.

4. The data processing device of claim 1, wherein the at least one processor is to initiate the security procedure to secure the cable and/or the transceiver.

5. The data processing device of claim 1, wherein the security procedure includes an automated reconnection process prior to permitting physical reconnection of a disconnected cable to the transceiver.

6. The data processing device of claim 1, wherein the at least one processor is to use the received physical layer characteristic data to determine a present security state of the cable communication subsystem, and determine the security procedure corresponding to the present predetermined security state.

7. The data processing device of claim 1, comprising a management server having program instructions stored in memory to cause the management server to automatically respond to the received data associated with the attenuation characteristic by initiating the security procedure.

8. The data processing device of claim 1, further comprising:
a storage device to store the received data associated with the attenuation characteristic.

9. The data processing device of claim 1, further comprising an interface to receive security policies, the security policies used to define predetermined security states based on the historical data and to define corresponding responsive security procedures.

10. The data processing device of claim 1, wherein the at least one processor is to identify a distance to a location of the optical tap along the cable.

11. The data processing device of claim 1, wherein the at least one processor is to initiate further respective security procedures responsive to the operating conditions.

12. A non-transitory computer readable medium storing computer program instructions to cause a processor to:
receive data obtained using an embedded reflectometer of a cable communication subsystem, the subsystem comprising a transceiver and at least one cable;
determine whether an attenuation pattern in the received data indicates that an optical tap has been placed on an optical fiber of the cable;
initiate a predetermined response in response to determining that the attenuation pattern indicates that the optical tap has been placed on the optical fiber;
receive physical layer characteristic data relating to the cable communication subsystem; and
determining operating conditions of the cable communication subsystem based on the physical layer characteristic data, the operating conditions including plural conditions selected from among: a condition in which the transceiver for communicating optical signals in the optical fiber has been swapped, a condition in which the cable has been disconnected and then reconnected, and a condition in which the cable has been replaced.

13. The non-transitory computer readable medium of claim 12, wherein the determining is based on comparing the received data obtained using the embedded reflectometer to historical embedded reflectometer data.

14. A method of applying physical layer security in a communication network, the method comprising:
receiving data relating to an attenuation characteristic of an optical fiber of a cable connected to a transceiver having an embedded reflectometer;
based on a comparison of the received data with historical data associated with the attenuation characteristic, determining that an optical tap has been applied to the optical fiber of the cable;
initiating a security procedure in response to determining that the optical tap has been applied to the optical fiber;
receiving physical layer characteristic data relating to a cable communication subsystem including a transceiver for communicating optical signals over the optical fiber; and
determining operating conditions of the cable communication subsystem based on the physical layer characteristic data, the operating conditions including plural conditions selected from among: a condition in which the transceiver has been swapped, a condition in which the cable has been disconnected and then reconnected, and a condition in which a connector of the cable is not engaged or is partially engaged.

15. The method of claim 14, wherein the received data relating to the attenuation characteristic is stored in a memory of the transceiver, and the stored data is communicated to another device for processing.

16. The method of claim 14, wherein the embedded reflectometer is an optical time domain reflectometer used to obtain the data relating to the attenuation characteristic.

17. The method of claim 14, comprising providing a real time transmission line tap monitor and response service.

18. The method of claim 14, wherein the security procedure is initiated automatically to disable a communication link including the cable.

19. The method of claim 14, wherein the received data relating to the attenuating characteristic is communicated through the communication network from a host device to a physical layer security manager for processing the received data relating to the attenuating characteristic.

20. The method of claim 14, further comprising identifying a distance to a location of the optical tap along the cable.

21. The method of claim 14, further comprising:
initiating further respective security procedures responsive to the operating conditions.

* * * * *